US005940521A

United States Patent [19]

East et al.

[11] Patent Number: 5,940,521

[45] Date of Patent: *Aug. 17, 1999

[54] AUDIO MIXING CONSOLE

[75] Inventors: John William East, Witney; Simon Irving Harrison, Stanton Harcourt; Paul Anthony Frindle, Witney; Tetsuya Konishi, Wootton, all of United Kingdom

[73] Assignees: Sony Corporation, Tokyo, Japan; Sony United Kingdom Limited, Weybridge, United Kingdom

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/649,054

[22] Filed: May 16, 1996

[30] Foreign Application Priority Data

May 19, 1995 [GB] United Kingdom .................. 9510201

[51] Int. Cl.[6] .............................................. H04B 1/00

[52] U.S. Cl. .............................................. 381/119

[58] Field of Search .............................. 381/119, 106, 381/109, 123, 104

[56] References Cited

U.S. PATENT DOCUMENTS 5,054,077 10/1991 Suzuki .............................. 381/119
5,060,272 10/1991 Suzuki .
5,175,771 12/1992 Zampini et al. .................... 381/119
5,233,666 8/1993 Deveau .............................. 381/119
5,257,317 10/1993 Stavrou .............................. 381/119
5,317,641 5/1994 Yasuda et al. ...................... 381/109

FOREIGN PATENT DOCUMENTS

0251646 A2 1/1988 European Pat. Off. .
0576110 A2 12/1993 European Pat. Off. .

OTHER PUBLICATIONS

WPI Abstract 94–110536 & DE 4,236,156, Apr.21, 1994.

*Primary Examiner*—Vivian Chang
*Attorney, Agent, or Firm*—Frommer Lawrence & Haug, LLP.; William S. Frommer

[57] ABSTRACT

An audio mixing console includes user controls which can be dynamically allocated to respective processing channels enabling a compact audio mixing console to be provided with full functionality, but with only a relatively small number of user operable controls including allocatable channel faders and allocatable audio signal processing control knobs and buttons, etc. Individual control values for the user operable control can be updated, maintained and retained for each of the processing channels which can be allocated to the individual user operable controls. Also, a single processing channel can be allocated to a user operable control on two sub-panels of the control panel and the user operable controls on both sub-panels can be used separately to control the processing within that channel. The resulting changes in the user operable control "positions" are displayed as a result of the dual control of a processing function within a processing channel by respective user operable controls on the respective sub-panels.

21 Claims, 3 Drawing Sheets

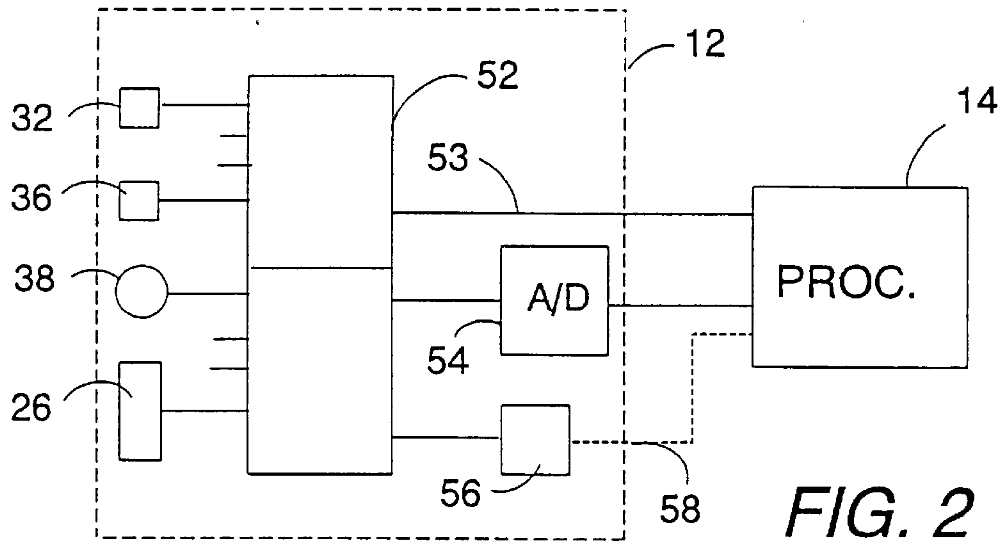
FIG. 2
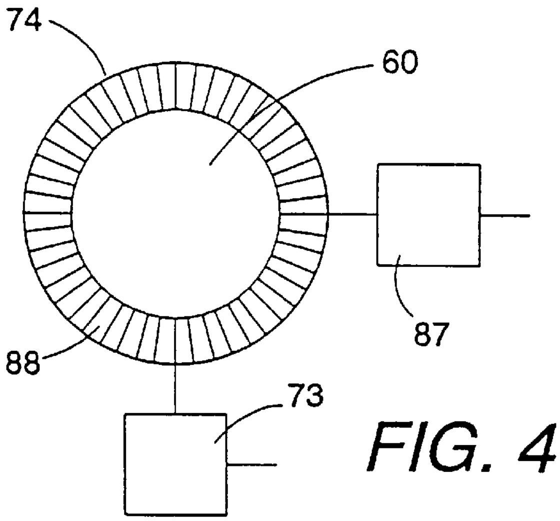
FIG. 4
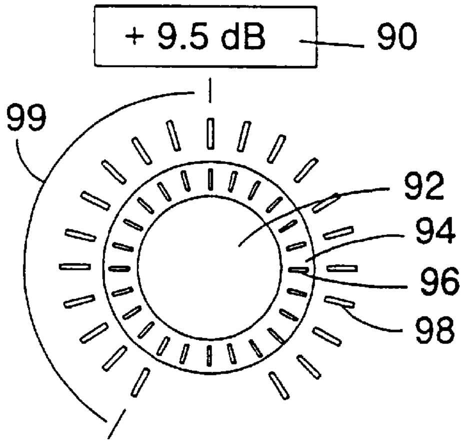
FIG. 4A
FIG. 5
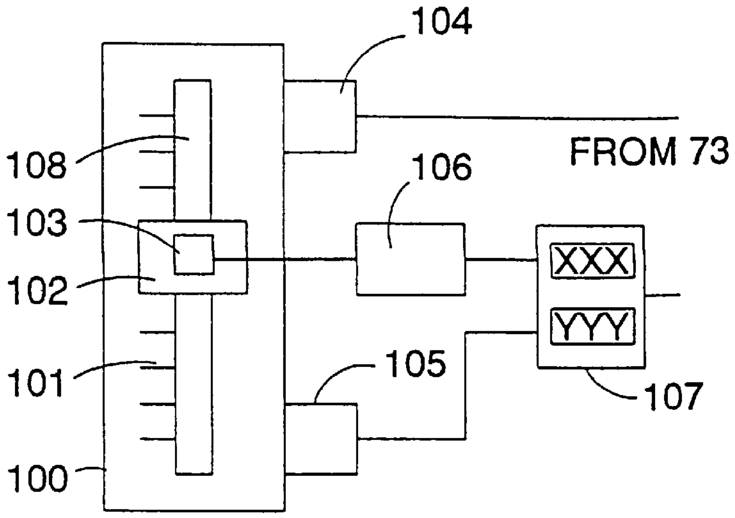

AUDIO MIXING CONSOLE

BACKGROUND OF THE INVENTION

1. Field of the Invention

This invention relates to an audio mixing console for processing a plurality of audio channels, in each of which a plurality of audio functions are to be performed.

2. Description of the Prior Art

Traditionally, audio mixing consoles have been based on discrete technology with audio signal processing modules connected together in a desired relationship and then controlled by manually operable switches on the console. However, traditional audio mixing consoles have a number of disadvantages including their physical size, the total number of manually operable controls (fader, potentiometers, switches, etc.), and the relative inflexibility of the overall arrangement.

Accordingly, it has been proposed to provide an audio mixing console comprising a front panel including a plurality of user operable controls for controlling different audio signal processing functions and a digital signal processor for processing audio signals in response to the settings of the user operable controls. It is hoped that such technology can lead to reductions in the overall size of such consoles while at the same time increasing flexibility. However, a disadvantage of such technology is the removal of the direct physical relationship between the actual audio functions and interconnections and user controls of the mixing console and the operation of those functions.

Typically, audio mixing consoles provide of the order of 128 channels, in each of which gain, equalisation and other audio processing functions can be performed. Each channel may require about 100 parameter adjustments (e.g. gain, equalisation filter frequencies, etc.,). In a traditional audio processing channel, each of these parameter adjustments will be assigned a dedicated control knob, switch or fader which results in a very large number of controls being required.

It has been proposed to reduce the number of control knobs in a multi-channel audio mixing console by assigning a reduced number of control knobs to each channel and then allowing those knobs to be used to make parameter adjustments for several different audio processing functions. In this way, a single knob may be used, for example, for gain and frequency control. It has also been proposed, for example, to use the main channel fader for filter frequency control. However, this approach of allocating different functions to a single knob is confusing to the user and causes problems where, for example, two functions assigned to a knob need to be adjusted in different ways at the same time.

SUMMARY OF THE INVENTION

In accordance with the present invention, therefore, there is provided an audio mixing console for processing a plurality of audio channels in each of which a plurality of audio processing functions are to be performed, said audio mixing console comprising a control panel having a plurality of user operable controls, each for a respective audio processing function, said console comprising means for dynamically assigning each said user operable control to a user selectable audio processing channel.

Thus, in an embodiment of the invention, each control knob or fader or other user input control always controls a particular audio processing function, but may be used to control that function for a number of different channels. This significantly reduces the confusion experienced by an operator in that the operator will normally be directing his attention to setting up the parameters for a particular channel at any one time. Arranging the control knobs on the front panel of the mixing console in a predetermined desired arrangement means that the operator can readily locate and operate the control which is needed in order to carry out the audio processing adjustments which the operator desires to perform on the selected channel.

Accordingly, the console preferably comprises a set of user operable controls for respective audio processing functions arranged within an area on said control panel and means for dynamically assigning said set of user operable controls to a user selectable audio processing channel.

Preferably, the console additionally comprises a bank of further user operable controls in the form of faders arranged within a further area of said control panel and associated with said set of user operable controls, and means for dynamically assigning said bank of faders to a group of audio channels, said means for dynamically assigning said set of user operable controls being constrained to assign said set to one of the group of audio channels to which the faders are currently selected.

Thus, the user is readily able to assign the bank of main channel faders to a particular group of the available channels and then to assign the set of user operable controls to one of the channels within the selected group and to perform the desired adjustments for that channel. In a preferred embodiment of the invention the faders are arranged in a row in front of the user with the user operable controls arranged on an area of the control panel immediately behind the faders.

Preferably, the console includes a plurality of sets (preferably two sets) of user operable controls, each in a respective area of said control panel and each set being individually assignable to a respective audio processing channel. Preferably, a respective bank of faders is associated with each set of user operable controls. In the preferred embodiment of the invention there are two banks of faders arranged either side of a central control area, each set of user operable controls which are assignable to a particular channel being located behind the respective bank of faders. The central control area can contain master faders and common processing functions.

Preferably, user operable control means (for example control buttons) are provided for selecting a group of channels to which a bank of faders is to be assigned and further user operable control means (e.g. control buttons) are provided for assigning the sets of user operable controls to a selected channel within the selected group of channels. In a preferred embodiment of the invention each user operable control is assigned to a particular audio processing function, although the invention does not exclude the possibility that certain user operable controls could be assigned to a plurality of functions.

Preferably the console comprises means for scanning and sampling the user operable controls to determine the actuation and current position thereof, much in the manner of the scanning of a keyboard in, for example, a computer system or the like.

Preferably, analog to digital converter means are responsive to said scanning means to convert analog sample values to corresponding digital values for processing in the console.

In order to perform the vast number of audio processing functions which are typically required in an audio mixing console, the console preferably comprises a highly parallel control and signal processing structure. Accordingly, said means for dynamically assigning said user operable controls comprises demultiplexer means for assigning a processing channel for the processing of function values derived from a said user operable control and multiplexer means for feeding back a resulting processed function value from said processing channel, said demultiplexer and multiplexer means being responsive to a control signal indicative of the processing channel for processing said function values from said user operable control.

The user operable controls comprise means for indicating changes representative of processed function values. For example, the user operable controls can be provided with illuminated indicators indicative of a setting of the user operable control. Such an indicator is particularly applicable where the user operable control is an an endlessly rotatable knob that is a rotatable knob without end stops. The user operable controls can also be motorised whereby the motor for the control is operated automatically on receipt of processed function values from the multiplexer means.

As mentioned above, in a preferred embodiment of the invention, the audio mixing console has two sets of user operable controls contained in respective areas (sub-panels) on the control panel, which sub-panels are identical in function. Each bank of faders for the sub-panel can comprise 24 faders which may be assigned to control the gain of a group of 24 channels from 128 possible channels. The user operable controls include equalisation and effects controls which apply to a currently selected single channel from the current group of 24 channels desired processing parameters. It will be appreciated that where 2 sets of user operable controls and faders are provided, which two sets may be dynamically allocated to selected channels, a conflict could occur if a single channel were selected by both sets of user operable controls. Accordingly, it has been proposed to provide an interlock to prevent the two sub-panels being used to control the same feature of the same channel at the same time. However, this limits the freedom of operation of the panel where, for example, two operators are active at one time.

Accordingly, in a further aspect of the invention, the invention provides a console comprising a plurality of sets of user operable controls, each simultaneously assignable to the same audio processing channel and each comprising respective demultiplexer and multiplexer means, an assigned processing channel for a user operable control comprising a folding adder function responsive to changes in the function value for said user operable control from either set of user operable controls and an end stop function responsively connected to said folding adder to prevent the function value for said processing value exceeding upper and lower limit values.

Thus, in accordance with this aspect of the invention, if the two sub-panels are set to the same group of channels or the same individual channel is selected for the set of user operable controls, any changes made on one sub-panel are mirrored by the controls on the other sub-panel. For example, if a fader is moved on one sub-panel, the corresponding fader for the corresponding channel on the other sub-panel moves under motorised control to a matching position. Also, where the control knobs are endless potentiometers for which the current "position" of the control is indicated by an illuminated segment (for example a LED) on the control knob skirt, on rotating a potentiometer on one sub-panel when the same channel is selected on the other sub-panel, the currently illuminated segment on the skirt on each of the two corresponding potentiometers is changed to reflect the new "position" of the moved potentiometer.

Preferably, each potentiometer generates function values between −1 and +1. The minus −1 and +1 positions are preferably immediately adjacent to and represent the position of the potentiometer at "6 o'clock".

The two potentiometer position outputs are supplied to the folding adder which adds the two numbers indicative of the two potentiometer positions. The term "folding adder" means that if the adder output reaches +1, further increases will cause the output to fold to −1 and continue increasing from there. This means that the adder output is always in the range −1 to +1. For example, in this folding arithmetic, the sum of +0.25 and +0.3 is +0.55, but the sum of +0.75 and +0.6 is in fact −0.65.

By supplying the output of the folding adder to an end stop, this function prevents the potentiometer output from increasing beyond +1 or decreasing further than −1. However, if the potentiometer output is end stopped at +1, any decrease in the folding adder output will cause the potentiometer output immediately to decrease from +1 towards 0. The output of the end stop function is supplied as a potentiometer output and also controls the display surrounding each potentiometer. Thus, this arrangement means that a change in one of the potentiometers is reflected in an increase in the notional position of both potentiometers and is displayed on both potentiometer displays.

In the case of a motorised moving fader where, in effect, the display (the position of the fader bar) is also the input device, a position change output from a fader is only effected if a finger detector associated with that fader detects that the fader has been touched by the user. Thus, where the system moves the fader in response to processed function values, no new input values are generated from the fader. Only when the fader is handled by the user are new input values from the fader generated.

Preferably, said demultiplexer means comprises a data buffer for each processing channel for maintaining and updating current function values for a processing channel currently selected by said control signal and for retaining the most recent function value for a processing channel not currently selected by said control signal and for subsequently renulling a processing channel when it is reselected.

In this manner the demultiplexer means maintains the current position value for unselected functions and up-dates the position value for current selected functions. The up-dated position value is supplied to the respective end stop function. The multiplexer selects the output of the currently selected end stop function to control the display of the currently selected function value.

As mentioned above, the user operable controls include rotatable potentiometer control knobs including illuminated segments around the knob skirt. One of the segments (e.g. an LED) can be illuminated to indicate the current "position" associated with that potentiometer.

Where the skirt with its LEDs rotates with a knob, a relatively good indication of the rotation of the knob is provided. However, the provision of a rotatable skirt with a plurality of LEDs is relatively expensive. If, as an alternative, the LEDs were fixed to the panel around the knob, then a relatively poor resolution of the rotation of the potentiometer would be achieved.

Accordingly, in a further aspect of the invention, a rotary control knob is provided with a ring of illuminable segments for indicating a value currently selected by said control knob, wherein said ring of illuminable segments is controlled to indicate a macro and a micro adjustment whereby one complete rotation of the micro adjustment corresponds to one increment of the macro adjustment, said micro and macro indicators being visually distinguishable. In this manner, a single ring of illuminable segments (e.g. LEDs) is used to indicate both a "macro" position and a "micro" position in the manner of the hour and minute hands of a clock. The micro indicator could be a single illuminated LED. In order to distinguish the two indicators, the macro indicator could be two adjacent illuminated LEDs or two diametrically opposed illuminated LEDs.

BRIEF DESCRIPTION OF THE DRAWINGS

An embodiment of the invention will be described by way of example only with reference to the accompanying drawings in which:

FIG. 2 is a schematic representation of the interconnection of user operable controls on the control panel 12 and the signal processing network of the mixing console of FIG. 1;

FIG. 4 is a schematic representation of a rotary control knob with a position indicator;

FIG. 4A illustrates an alternative display arrangement for a rotary control knob; and FIG. 5 is a schematic representation of a fader with associated control circuitry.

DESCRIPTION OF THE PREFERRED EMBODIMENTS

Figure 1:
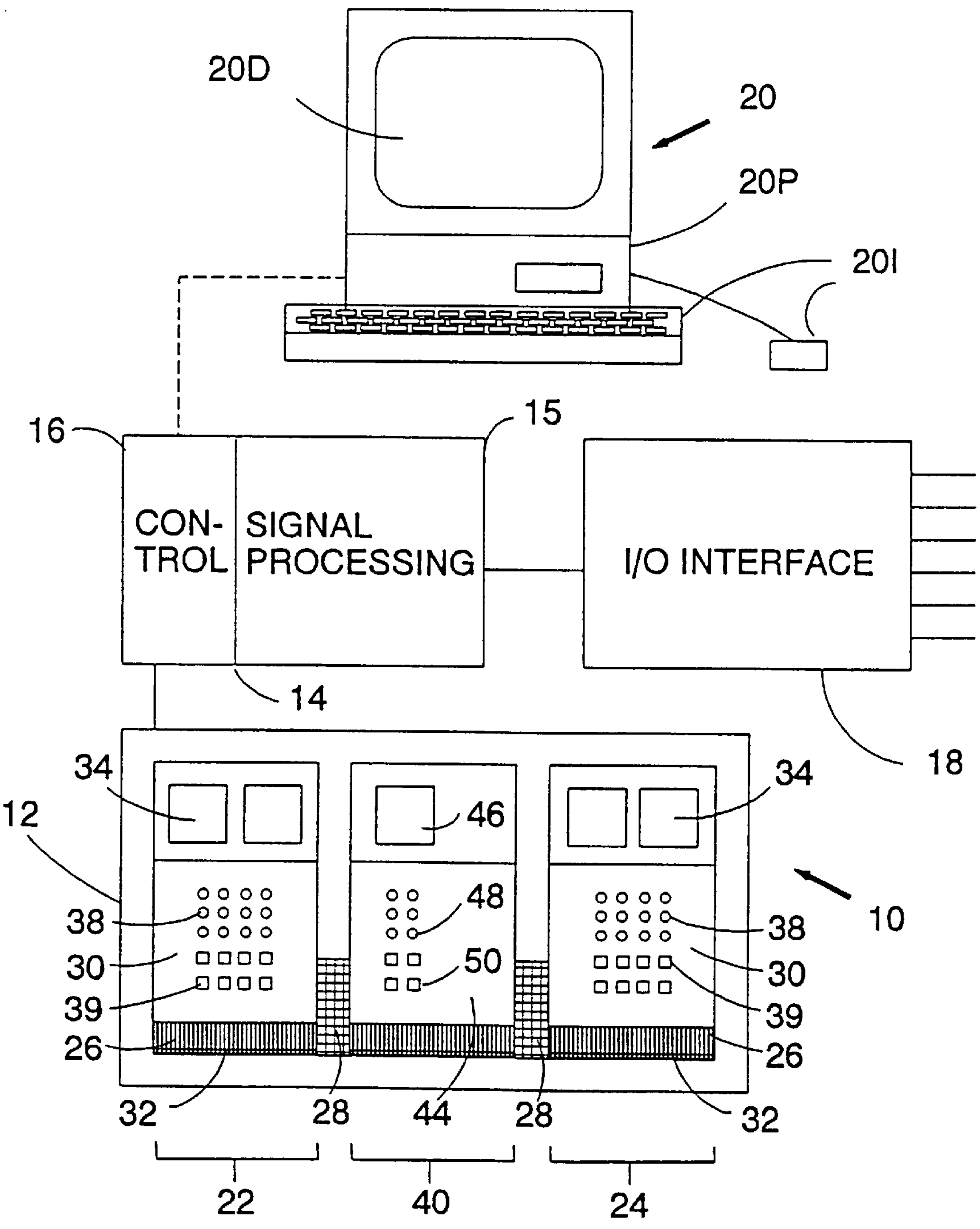
FIG. 1 is a schematic block diagram of a mixing console for audio signal processing.

FIG. 1 represents a simplified schematic block diagram of a mixing console 10 for use in an audio recording studio. The console 10 comprises a front panel 12, a processor network 14 comprising an array of signal processors 15 and a plurality of control processors and buffer circuitry 16, and one or more input/output interface processors and interfaces 18. Also shown in FIG. 1 is a host unit 20, which could be permanently connected to the remainder of the system, or could be connected only during initialisation and debugging stages of operation.

The panel 12 comprises an array of operator controls including faders, switches, rotary controllers, video display units, lights and other indicators, as represented in a schematic manner in FIG. 1. Optionally the panel 12 can also be provided with a keyboard, tracking device(s), etc, and general purpose processor (not shown) for the input of and control of aspects of the operation of the console. One or more of the video display units on the panel can then be used as the display for the general purpose computer.

In one embodiment, the host unit 20 is implemented as a general purpose workstation incorporating a computer aided design (CAD) package and other software packages for interfacing with the other features of the mixing console. The host unit could alternatively be implemented as a purpose built workstation including special purpose processing circuitry in order to provide the desired functionality, or as a mainframe computer, or part of a computer network. As shown in FIG. 1, the control unit 20 includes a display 20D, user interface devices 20I such as a keyboard, mouse, etc., and a processing and communication unit 20P.

In normal operation, control of the mixing console is performed at the front panel, or mixing desk 12. The mixing console 10 is connected to other devices for the communication of audio and control data between the processor network 14 and various input/output devices (not shown) such as, for example, speakers, microphones, recording devices, musical instruments, etc. Operation of the studio network can be controlled at the front panel or mixing desk 12 whereby communication of data between the devices in the studio network and the implementation of the necessary processing functions is performed by the processor network 14 in response to operation of the panel controls.

The processor network 14 can be considered to be divided into a control side 16, which is responsive to the status of the various controls on the front panel 12, and an audio signal processing side 15 which implements the required audio processing functions in dependence upon the control settings and communicates audio data with the studio network via the I/O interface 18.

The processing of digital audio data is performed by a parallel signal processing array 15 comprising a large number of signal processing integrated circuits (SPICs). The SPICs operate under microprogram control, microcode being loaded by the host unit 20 in an initialisation phase of operation. In the preferred embodiment the processor network 14 is arranged on a rack to which is attached a plurality of cards. Each card carries an array of, for example, 25 SPICs, the horizontal and vertical buses being connected between the cards so that from a logical and electrical point of view the SPICs form one large array. The buses may be connected in a loop with periodic pipeline registers to allow by-directional communication around the loop and to extend the connectivity of the array. The signal processors are also connected to the I/O interface 18.

The parallel processing array as a whole provides for the implementation of all the audio processing functions that are required depending on the configuration of the studio network and the control settings at the front panel 12 by defining digital audio processing channels on the signal processing network. The microcode loaded during the initialisation phase provides for individual audio signal processing functions, although the routing of data and the supply of coefficient data is under the control of the control processor(s) 16 at run time. To switch in or out a particular function, or to alter the routing of data, the control processor (s) 16 interface with the array of SPICs 15 to write signal data, coefficients and addresses to the SPICS and to read signal data, coefficients and addresses from the SPICS.

The control processor(s) 16 are responsive to operation of the user operable panel controls such as channel faders 26, switches 39 and control knobs 38, etc., by an operator to vary the characteristics such as signal levels, etc., of audio signals.

As can be seen in FIG. 1, the control panel of the mixing console is divided into two main sub-panels 22 and 24 with a central control panel 40. The sub-panels 22 and 24 are preferably configured in the same manner so that the user may use either the left hand or right hand sub-panel without having to adapt his or her mode of operation. The central control panel 40 contains centralised functions which are applicable to the overall operation of the control panel and to the operation of the individual sub-panels 22 and 24.

Directly below each fader of the group of channel faders 26 is a control button of a bank of control buttons 32 for assigning the associated control area 30 to a particular channel to which the particular button in the button bank 32 and the corresponding fader in the fader bank 26 is assigned.

Each of the sub-panels 22 and 24 and the control panel 40 includes visual displays 34, 46 for representing desired information. Also, visual indicators are associated with the buttons 32 and 39 to indicate when they are activated and visual displays are associated with the control knobs 38 to indicate the current "position" of those control knobs.

FIG. 2 is a schematic representation of the relationship between the user input devices (including the switches 32 and 36 and the analogue user devices 26 and 38) on the control panel and the processor network 14. Specifically, the control panel 12 comprises a multiplexing arrangement 52 which is responsive to a scan controller 56 to individually sample all of the user operable controls on the control panel in sequence. The values sampled from the user input devices providing binary output signals such as the switches 32 are passed directly via a line 53 to the processor network 14 as time multiplexed signals. Analogue values sampled from analogue input devices such as control knobs 38 and fader 26 are supplied in a time multiplexed manner via an A/D converter 54 to the processor network 14. Thus, the user operable controls on the control panel 12 are sampled in a manner which will be familiar to one skilled in the art of user input devices such as keyboards, etc. The scanning controller 56 can be included within the control panel 12 as illustrated in FIG. 2, or, alternatively, the scan control can be provided directly from the signal processing network 14 as represented by the dashed line 58.

In operation, the user selects a particular group of 24 of the available channels (as mentioned a group of, for example, 24 channels from 128 channels in the preferred embodiment), by operation of an appropriate one of the block of keys 28 for a particular sub-panel (e.g. sub-panel 22). Then, by operation of the control key 32 above a particular channel fader in the bank of faders 26, the user assigns the control knobs and buttons 38 and 39 of the control area 30 to the selected channel. The control parameters for that audio processing channel can then be adjusted and controlled by operation of the user operable control knobs 38, buttons 39, and the channel fader for that channel. At the same time, the gain for the other channels in the selected group of channels can be adjusted by the other faders within the bank of faders 26. The group of channels selected can be changed at any time by operation of an appropriate key in the block of keys 28 and the assignment of the control knobs 38 and buttons 39 in the control area 30 can be changed to any one of channels of the selected group of channels by operation of the appropriate control button in the bank of control buttons 32.

As it is necessary to maintain the values set in each of the variable channels, whether or not they are currently selected for adjustment on the sub-panel 22, it is necessary that the control values associated with each of the user operable controls is separately controlled in a signal processing channel for the corresponding audio processing channel.

Also, given that two sub-panels 22 and 24 are provided on the control panel 12 and in order that each sub-panel can be freely assigned to any desired group of channels and the control area 30 for each of the sub-panels 22 and 24 can be freely assigned to an individual channel, it is necessary to provide a control structure which enables contention to be resolved when a user operable control is assigned to the same function within the same channel on each of the sub-panels 22 and 24.

Figure 3:
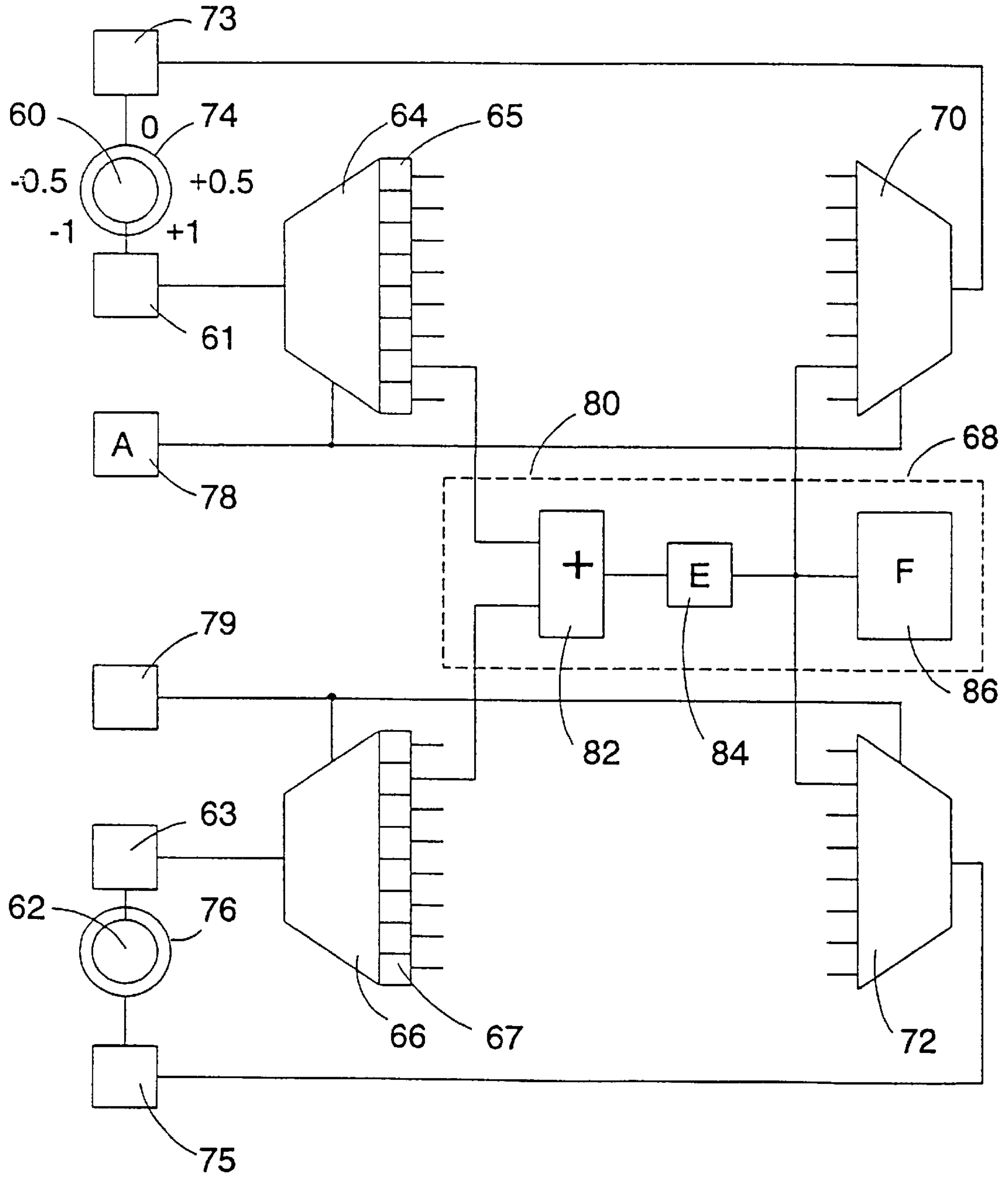
FIG. 3 is a schematic representation of the connection of two user operable controls to a single processing channel of the mixing console of FIG. 1.

FIG. 3 is a schematic representation of the control structure in accordance with the present invention which enables these objects to be met.

In FIG. 3, 60 and 62 represent two endlessly rotatable control knobs on the first sub-panel 22 and the second sub-panel 24, respectively. The console is responsive to a change in position of the control knob 60 as sampled by the scanning mechanism to generate an output representative of an incremental rotation of the control knobs 60 and 62. The function of generating the incremental rotation signal is represented at 61 for the control knob 60 and at 63 for the control knob 62. This function can be provided in the signal processing structure or could be provided in the control panel itself. Typically an absolute position value for each user operable control on each scan of the user operable controls is stored and then a difference signal is generated by comparison of the currently sampled value with a previously stored value.

It will be appreciated that the direct line connection between the control knobs 60/62 and the respective position signal generation 61/63 represent, in this case, a connection via the control structure illustrated in FIG. 2. The output from the position signal generator 61/63 is supplied to a demultiplexer/assignment function 64/66 which dynamically assigns the control knob to one of the available signal processing channels (in the present embodiment 128 signal processing channels).

The multiplexer/assignment function 64 for the control knob 60 is controlled by a channel selection controller 78 which is responsive to the operation of one of the block of control buttons 28 to select a group of control channels and the operation of an individual control button in the bank of control buttons 32 to select an individual channel. The output of the position signal generator 61 for the control knob 60 is arranged to generate a signal in fractional 2's complement arithmetic having a value between −1 and +1. The position of the control knob is thus encoded as a binary value between −1 and +1. The −1 and +1 values are representative of positions immediately adjacent to "6 o'clock". The output of the position signal generator 61 is supplied via the multiplexer/assignment function 64 to the appropriate signal processing channel 68 in accordance with the channel selection from the channel selection controller.

Similarly, the position signal generator 63 generates a position output indicative of the position of the control knob in fractional 2's complement notation with the position of the control knob encoded as a binary value between −1 and +1, the −1 and +1 positions being immediately adjacent to and representative of the position of the control knob at "6 o'clock".

The output of the position indicator 63 is supplied via the multiplexer/assignment function 66 to the audio processing channel 68 as determined by the channel selection controller 79. The channel selection controller 79 is responsive to the operation of one of the block of control buttons 28 to select a group of channel and operation of a selected one of a bank of control buttons 32 to select a particular channel.

In the present instance, it is assumed that both the control knob 60 and the control knob 62 are assigned to the same audio processing channel 68 and represent the same function within the channel. The outputs of the multiplexer/assignment function 64 and 66 are supplied to a folding adder 82 which adds the two numbers indicative of the two control knob positions. The term "folding adder" means that when the adder output reaches +1, further increases will cause the output to fold to −1 and continue increasing from there. This means that the adder output is always in the range of −1 to +1. For example, in this folding arithmetic, the sum of +0.25 and +0.3 is +0.55, but the sum of +0.75 and +0.6 is in fact −0.65. The output of the folding adder 82 is supplied to an end stop controller 84. This controller does not allow an output value to increase beyond +1 or decrease further than −1. However, if the output is end stopped at +1, any subsequent decrease in the folding adder output will cause the pot output immediately to decrease from +1 towards 0. It will be noted that the operation of the multiplexer 70 and 72 is controlled by the output of the channel selection controllers 78 and 79, respectively. The output of the end stop controller 84 is also supplied to control the audio signal processing function 86 within the signal processing channel 68.

The output of the multiplexer 70 is supplied to a display controller 73 for controlling a display 74 representative of the current position of the endlessly rotatable control knob 60. The values −1, −0.5, 0, +0.5 and +1 shown in FIG. 3 are not actually displayed on the display 74, rather they represent the position around the circumference of the control knob corresponding to the various values of the output of the multiplexer 70 and the values supplied by the position indicator 61.

Similarly, the output of the multiplexer 72 is supplied to a display controller 75 for controlling the current display position of the control knob 76.

As a result of this control structure, any change in one of the control knobs 60 or 62 will cause a resulting change in the indicated position of that control knob and also of the indicated position of the other of said control knobs.

As it is possible at any time during operation of the device to change the channel to which the user operable controls (for example the control knob 60) is assigned, it is necessary to retain the last user operable control position selected for a particular channel when that channel is no longer selected so that, on re-selecting the channel, the current value can be recovered. Accordingly, for this purpose, each multiplexer/assignment function 64 is provided with a bank of signal buffers 65 in which the last selected value for each of the available channels is retained.

FIG. 4 is a schematic representation of a continuously rotatable control knob 60 with an absolute position detector 87 for detecting the absolute position of the control knob and a display controller 73 for controlling the display of the current position of the control knob by means of a position indicator 74 comprising a plurality of illuminable segments 88. In the preferred embodiment of the invention, the position indicator 74 comprises a ring of 30–40 LEDs which are arranged as a skirt around a control knob, but are fixed to the control panel surrounding said control knob. The illumination of the individual LEDs is arranged to be performed in the manner of the hour and minute hands on a clock so that "macro" and "micro" position changes can be represented. For example, one complete rotation of the micro position indicator could represent one increment of the macro position indicator.

In one embodiment of the invention, the micro position indicator is represented by a single illuminated LED. A macro position indicator, on the other hand, is identified by two illuminated LEDs, which can either be immediately adjacent one another, or diametrically opposed to one another.

FIG. 4*a* illustrates an alternative display arrangement for a rotatable knob. In this display arrangement, a rough knob value can be indicated by a first ring of LED indicators 96 provided on a skirt 94 which rotates with a knob 92 and a second ring of position indicators 98 fixed to the front of the control panel. The range indicated by the curve 99 can be changed according to use. The rotation indicated by the curve 99 could, for example, be 20 dB or 3 dB. In addition, an accurate knob value could be indicated by means of a digital display 90.

As an alternative, the position indicator 74 could comprise two concentric rings of LEDs with the micro position indicator being represented by illumination of a corresponding position LED in both the inner and outer ring and the macro position indicator being represented by the illumination of a single LED on the inner ring of LEDs. It will be appreciated that other specific configurations of LEDs could be employed to represent the micro and macro position indicators. For example, differently coloured LEDs could be used to represent the macro and micro functions.

FIG. 5 is schematic representation of a user operable control in the form of a fader. The fader 100 comprises a scale 101 with a fader bar 102 which is slidable between end positions along a slide 108. The current position of the fader bar 102 is represented by a position sensor 105. The fader of FIG. 5 is motorised by means of a motor 104 which is responsive to signals received, for example, from a display controller such as the display controller 73 of FIG. 3. It will be appreciated that a manual fader of the type illustrated in FIG. 5 does not require a separate position indicator to indicate the current position of that fader, this being represented instead by movement of the fader bar 102 by the motor 104 in response to signals from the display controller 73. However, this arrangement can provide problems in a situation such as illustrated, for example, in FIG. 3 where it is necessary to distinguish between operation of the fader by the system and operation of the fader by the user.

Accordingly, in order to detect whether a user is operating the fader control, a sensor 103 is provided on the fader bar. A detector 106 detects operation of the sensor 103. Preferably, the sensor 103 is a capacitive sensor for detecting the presence of an operator's finger. By the provision of the capacitive sensor 103 and the detector 106, it is possible to determine when movement of the fader has been performed by the user. Only in this case is the output of the position detector 105 used to indicate a changed input variable for processing. This is achieved by a nulling function 107, controlled by the output of the touch detector 106. When the touch detector output is 'off', indicating that the user is not touching the fader, the motor 104 can position the fader in response to the display controller 73. During this operation, the nulling function 107 stores the current position of the fader from the position detector 105 in a register XXX (not shown). When the user touches the fader, the touch detector 106 operates to freeze the current value in the register XXX. If the fader is now moved by the user, the difference between the stored value in the register XXX and the instantaneous value from the position detector 105 is output via a register YYY (not shown) for subsequent processing. When the fader is released by the user, and the fader is subsequently moved by the motor 104, the output value in the register YYY is held constant while the value in the register XXX is updated with the current value from the position detector. On subsequent operation of the touch detector 106 the difference between the current value of the position detector 105 and the register XXX is added to the register YYY to provide the new output value. In this way the output value always represents the total sum of all position movements while the touch sensor was active, irrespective of any motor-driven movements which may have occurred in between.

There has been described various aspects of an audio mixing console with user controls which can be dynamically allocated to respective processing channels. As a result of the present invention, it is possible to provide a compact audio mixing console with full functionality, but with only a relatively small number of user operable controls including allocatable channel faders and allocatable audio signal processing control knobs and buttons, etc. There has been described a data processing structure whereby individual control values for the user operable controls can be updated, maintained and retained for each of the processing channels which can be allocated to the individual user operable controls. Also, a processing structure has been described whereby a single processing channel can be allocated to a user operable control on two sub-panels of the control panel and the user operable controls on both sub-panels can be used separately to control the processing within that channel. There has also been described aspects of the display of the resulting changes in the user operable control "positions" as a result of the dual control of a processing function within a processing channel by respective user operable controls on the respective sub-panels.

Although particular embodiments of the invention have been described in the present application, it will be appreciated that many modifications and/or additions may be made to the particular embodiments within the spirit and scope of the present invention.

For example, although in FIG. 1 a control panel is shown which comprises two sub-panels and a central control area, it will be appreciated that a different number of sub-panels could be provided in an alternative embodiment of the invention. Also, a different number of faders could be provided within each sub-panel. Moreover, it will be appreciated that a different arrangement of the various control areas within the control panel could be provided in alternative embodiments of the invention.

We claim:

1. An audio mixing console for processing a plurality of audio channels in each of which a plurality of audio processing functions are to be performed, said audio mixing console comprising a control panel having at least one set of user operable controls arranged within an area on said control panel, for each said set each of said user operable controls is operable to control a respective audio processing function, wherein said console comprises means for dynamically assigning each said set of user operable controls to a user selected audio processing channel so that for said assigned set the assignment of said respective user operable controls to said selected audio processing channel is substantially simultaneous and the audio processing functions controlled by said respective user operable controls are carried out by the selected audio processing channel independent of the audio processing functions being carried out by other audio processing channels.

2. A console according to claim 1 additionally comprising a bank of further user operable controls in the form of faders arranged within a further area of said control panel and associated with said set of user operable controls, and means for dynamically assigning said bank of faders to a group of audio channels, said means for dynamically assigning said set of user operable controls being constrained to assign said set to one of the group of audio channels to which the faders are currently selected.

3. A console according to claim 2 comprising a plurality of sets of user operable controls each in a respective area of said control panel, each set being individually assignable to a respective audio processing channel.

4. A console according to claim 3 wherein a respective bank of further user operable controls in the form of faders is associated with each set of user operable controls.

5. A console according to claim 2 comprising user operable control means for assigning user operable controls to selected audio processing channels.

6. A console according to claim 2 wherein each user operable control is assigned to a particular audio processing function.

7. A console according to claim 2 wherein said user operable controls include one or more of the following types of controls including push buttons, faders and rotary control knobs.

8. A console according to claim 2 comprising means for scanning and sampling said user operable controls to determine the activation thereof.

9. A console according to claim 8 comprising analogue to digital converter means responsive to said scanning means to convert analogue sample values to corresponding digital values.

10. A console according to claim 9 comprising processing means for processing audio signals in accordance with sampled audio processing function values.

11. A console according to claim 2 wherein said means for dynamically assigning said user operable controls comprises demultiplexer means for assigning a processing channel for the processing of function values derived from a said user operable control and multiplexer means for feeding back a resulting processed function value from said processing channel, said demultiplexer and multiplexer means being responsive to a control signal indicative of the processing channel for processing said function values from said user operable control.

12. A console according to claim 11 wherein said user operable controls comprise means for indicating changes representative of said processed function values.

13. A console according to claim 12 wherein a said user operable control is provided with illuminated indicators indicative of a setting of the user operable control.

14. A console according to claim 13 wherein said user operable control is an endlessly rotatable knob.

15. A console according to claim 12 wherein said user operable control is motorized.

16. A console according to claim 15 wherein said motorised user operable control is provided with a sensor for indicating when said control is touched by a user.

17. A console according to claim 11 comprising a plurality of sets of user operable controls, each simultaneously assignable to the same audio processing channel and each comprising respective demultiplexer and multiplexer means, an assigned processing channel for a user operable control comprising a folding adder function responsive to changes in the function value for said user operable control from either set of user operable controls and an end stop function responsively connected to said folding adder to prevent the function value for said processing value exceeding upper and lower limit values.

18. A console according to claim 17 wherein said user operable control is a potentiometer which generates function values between −1 and +1.

19. A console according to claim 11 wherein said demultiplexer means comprises a data buffer for each processing channel for maintaining and updating current function values for a processing channel currently selected by said control signal and for retaining the most recent function value for a processing channel not currently selected by said control signal and for subsequently renulling a processing channel when it is reselected.

20. A console according to claim 2 wherein at least one said user operable control is a rotary control knob provided with a ring of illuminable segments for indicating a value currently selected by said control knob, wherein said ring of illuminable segments is controlled to indicate a macro and a micro adjustment whereby one complete rotation of the micro adjustment corresponds to one increment of the macro adjustment, said micro and macro indicators being visually distinguishable.

21. A console according to claim 20 wherein said micro and macro indicators are visually distinguished by one or more of the following characteristics, namely colour, size or position.

* * * * *